No. 694,736. Patented Mar. 4, 1902.
N. W. GALES.
LINER FOR CENTRIFUGAL LIQUID SEPARATORS.
(Application filed Jan. 4, 1902.)
(No Model.)

WITNESSES:
Geo. R. Turner
W. E. Kennedy

INVENTOR
Nicholas W. Gales.
BY
G. C. Kennedy,
ATTORNEY

THE NORRIS PETERS CO., PHOTO-LITHO., WASHINGTON, D. C.

UNITED STATES PATENT OFFICE.

NICHOLAS W. GALES, OF WATERLOO, IOWA.

LINER FOR CENTRIFUGAL LIQUID-SEPARATORS.

SPECIFICATION forming part of Letters Patent No. 694,736, dated March 4, 1902.

Application filed January 4, 1902. Serial No. 88,372. (No model.)

*To all whom it may concern:*

Be it known that I, NICHOLAS W. GALES, a citizen of the United States, residing at Waterloo, in the county of Blackhawk and State of Iowa, have invented certain new and useful Improvements in Liners for Centrifugal Liquid-Separators, of which the following is a specification.

My invention relates to improvements in liners for centrifugal liquid-separators, and especially to the class of liners which are composed of superimposed separated conical disks; and the object of my improvement is to so vary the form of the disks and the manner of passage of milk through and over them as to delay the movement of the milk in the separator-bowl, and thereby induce more thorough separation of the cream therefrom. This object I attain by the means illustrated in the accompanying drawings, in which—

Figure 1:
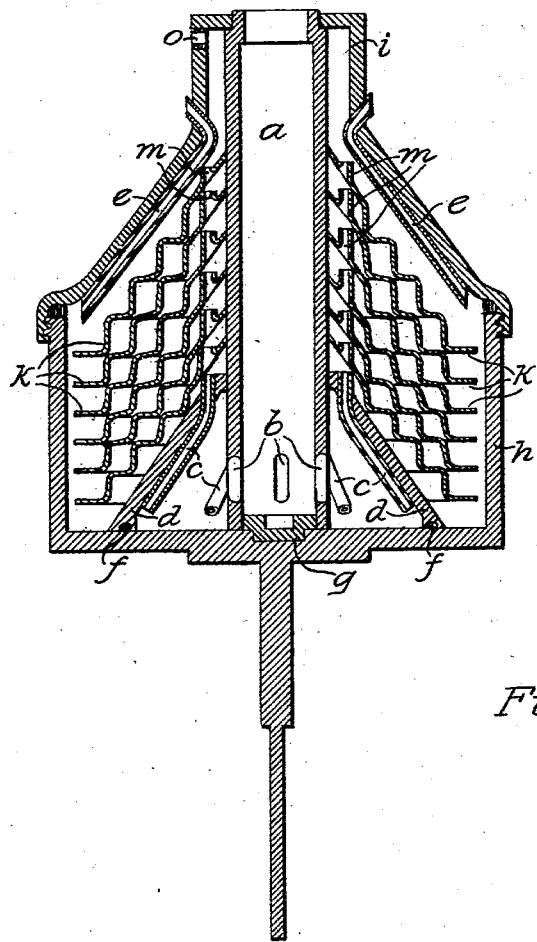
Figure 2:
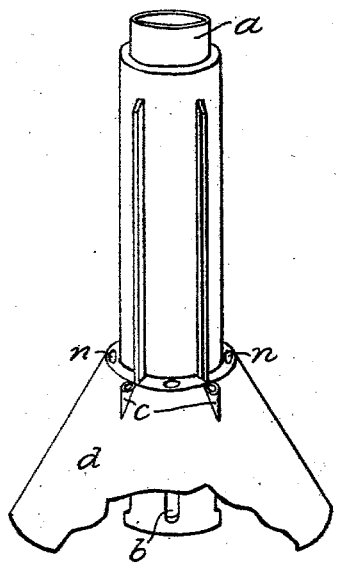
Figure 3:
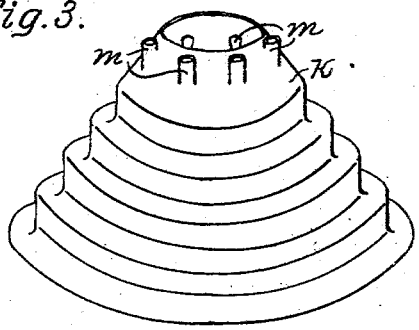

Figure 1 is a vertical section of a separator-bowl containing my improved form of liner. Fig. 2 is a perspective view of the milk inlet and distributing tube, and Fig. 3 is a perspective view of one of the conical disks.

Similar letters refer to similar parts throughout the several views.

The separator-bowl shown is constructed in two parts, the upper part $l$ fitting over the lower part $h$. About the central point of the bottom of the inner side of the bowl is fitted a boss $g$, which engages the inner side of the lower end of the milk-introduction tube $a$, keeping the latter in its proper position within the bowl. The milk-introduction tube $a$ has its upper end open for the introduction of milk from without and is also provided with oblong openings $b$ near its lower end, so arranged as to permit the milk to flow out into the receiving-cone $d$, the latter being joined to the tube $a$ above and having its lower edge in contact with the bottom of the inside of the separator-bowl and being rendered leakage-proof by means of a rubber ring $f$, placed in a groove in its lower edge and compressed between it and the bottom of the inside of the bowl. In the upper horizontal surface of the truncated cone $d$ openings $n$ are placed, extending from above downward to form cream-exits for such of the cream as is separated within said cone. Several milk-exit tubes $c$ are placed along the inner wall of the cone $d$, their upper ends passing through the cone just outside of the truncated edge thereof. The lower ends of these milk-tubes are but a short distance above the bottom of the bowl $h$. The remainder of the interior space of the bowl is nearly filled with a series of superposed conical disks $k$. These disks are stepped or corrugated concentrically, and a number of short tubes $m$ are fixed within the upper part of each at such a distance from the axis of the bowl as to bring them just without the clear cream zone thereof. These openings may be formed by either punching holes through the disks, leaving raised rims around them, or by introducing short tubes. The lowermost of the disks $k$ rests just above the cone $d$ and is supported above it by the outer edges of the milk-tubes $c$. In like manner each of the other disks $k$ when superposed over the one below it is supported a short distance above such lower disk by means of the outer edges of the rims of the short tubes or punched openings $m$.

Several tubes $e$ for the exit of the skimmed milk are fixed radially about the inner periphery of the upper portion $i$ of the bowl, their inner ends opening near the inner periphery of the lower portion $h$ of said bowl. The other ends pass through the upper portion of the bowl. A cream-exit $o$ is placed within the upper portion of the bowl.

The method of operation of my improved liner is as follows: Milk being introduced into the tube $a$ passes thence through the openings $b$ into the inner chamber bounded by the cone $d$. There, through the influence of centrifugal force, it is projected radially against the inner periphery of the cone and undergoes a partial separation, the cream passing upward through the holes $n$ into the cream zone of the separator-bowl. The milk which has thus been partially deprived of its cream, being by its greater weight deflected to the inner periphery of the cone $d$, is forced upward through the tubes $c$ into the interior of the bowl $h$, arriving in said bowl at points just outside the pure-cream zone thereof. The short tubes $n$ of the conical disks $k$ are situated at the same distance from the axis of the bowl as is the upper end of the tube $c$.

Portions of the milk issuing from the tube c are forced upward through the short tubes m. Such particles of the milk as are not caught by the short tubes m are flung out radially and contact with the surfaces of the conical disks k, passing over them, the heavier watery particles of the liquid separating in transit from the lighter, the heavier particles seeking the inner periphery of the bowl, and the lighter particles seeking the cream zone surrounding the axis of the bowl.

Somewhat similar forms of separator-liners have heretofore been constructed; but it is believed that the peculiar form of construction here shown tends to a greater thoroughness in the separation of the milk than any other of said forms. This greater thoroughness in separation is due first to the manner of introducing the partially-separated milk through the tubes c into the inner chamber of the separator at points just without the cream zone thereof and the prolongation of the separation caused by the partial passage of the milk through the short tubes m and the increase of frictional resistance to the flow of the milk by reason of increasing the surface areas of the conical disks by stepping or corrugating them. The retardation induced by said increased frictional resistances and by the interference caused by the angles of the corrugations crossing the radial lines along which milk tends to be carried by centrifugal force greatly increases the effectiveness of the separator. Another advantage results from the fact that whatever cream is skimmed from the milk while the latter is yet within the chamber in the cone d is brought directly into the cream zone in the interior of the bowl, and a remixing of it with the partially-separated milk in the bowl is avoided. This expedites the process of separation.

Having described my invention, what I claim as new, and desire to secure by Letters Patent, is—

1. In a centrifugal liquid-separator, the combination with a bowl, having a central boss or raised portion upon the inner side of the bottom thereof, of a removable central axial inlet-tube having an open lower end, which rests upon the bottom of the bowl and embraces the boss or raised portion, and also provided with lateral discharge-openings, a conical distributer embracing and carried by the inlet-tube, and also having an open and unobstructed bottom, the marginal edge of which rests upon the bottom of the bowl, distributer-tubes rising from the conical distributer and opening into the space above, openings in the conical distributer affording communication between the interior thereof and the cream zone of the bowl, and removable superposed corrugated conical separating devices provided with a plurality of perforations having raised rims, substantially as described.

2. A liner for centrifugal liquid-separators, consisting of an inlet-tube, which is open at its opposite ends and also provided with lateral discharge-openings near its lower end, a conical distributer embracing the inlet-tube above the discharge-openings, a plurality of distributer-tubes rising from the distributer, their open lower ends communicating with the interior of the distributer and their open upper ends communicating with the space above said distributer, a plurality of openings in the upper part of said distributer communicating with the cream zone of the bowl, and a series of superposed corrugated conical separating devices surrounding said inlet-tube and which are provided with a plurality of short tubes, all substantially as described.

3. A liner for centrifugal liquid-separators, consisting of a combination of superposed corrugated conical separating devices provided with a plurality of openings having raised rims, an inlet-tube, and a distributer provided with passages for separated cream and exit-tubes for partially-separated milk, substantially as described.

4. In a liner for centrifugal liquid-separators, an inlet-tube open at its opposite ends and having lateral discharge-openings near its lower end, and a conical distributer embracing the inlet-tube above the discharge-openings, said distributer having a plurality of tubes open at top and bottom passing through it and attached to its inner periphery, said distributer also provided with a plurality of cream-exits in its upper part, substantially as described.

In testimony whereof I affix my signature in presence of two witnesses.

NICHOLAS W. GALES.

Witnesses:
GEO. R. TURNER,
M. E. KENNEDY.